Nov. 12, 1963    V. C. WESTCOTT ET AL    3,110,890
APPARATUS FOR MEASURING FLUID LEVEL
Filed March 3, 1958    4 Sheets-Sheet 1
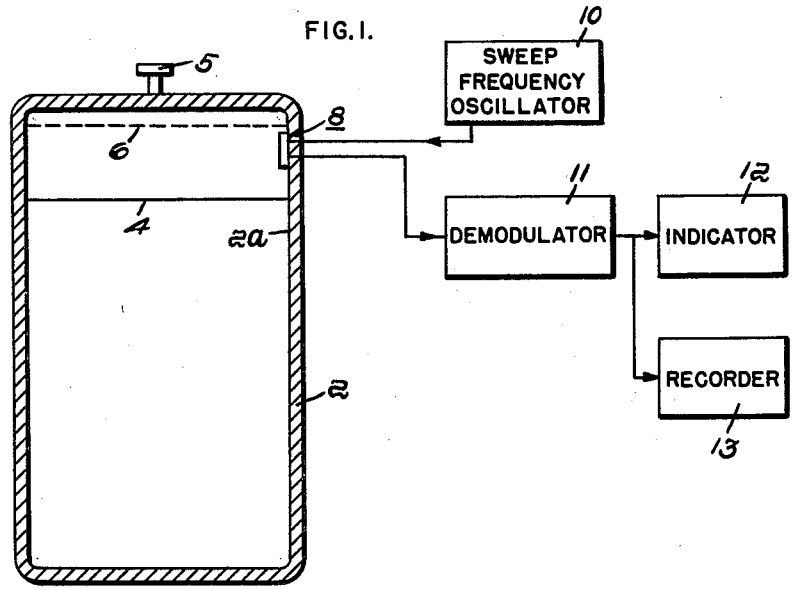
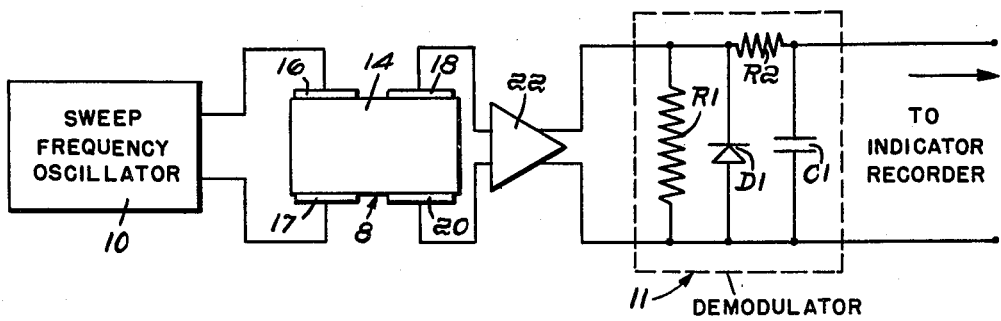
INVENTORS:
VERNON C. WESTCOTT,
ROBERT L. BLANCHARD,
BY *Blair & Spencer*
ATTORNEYS

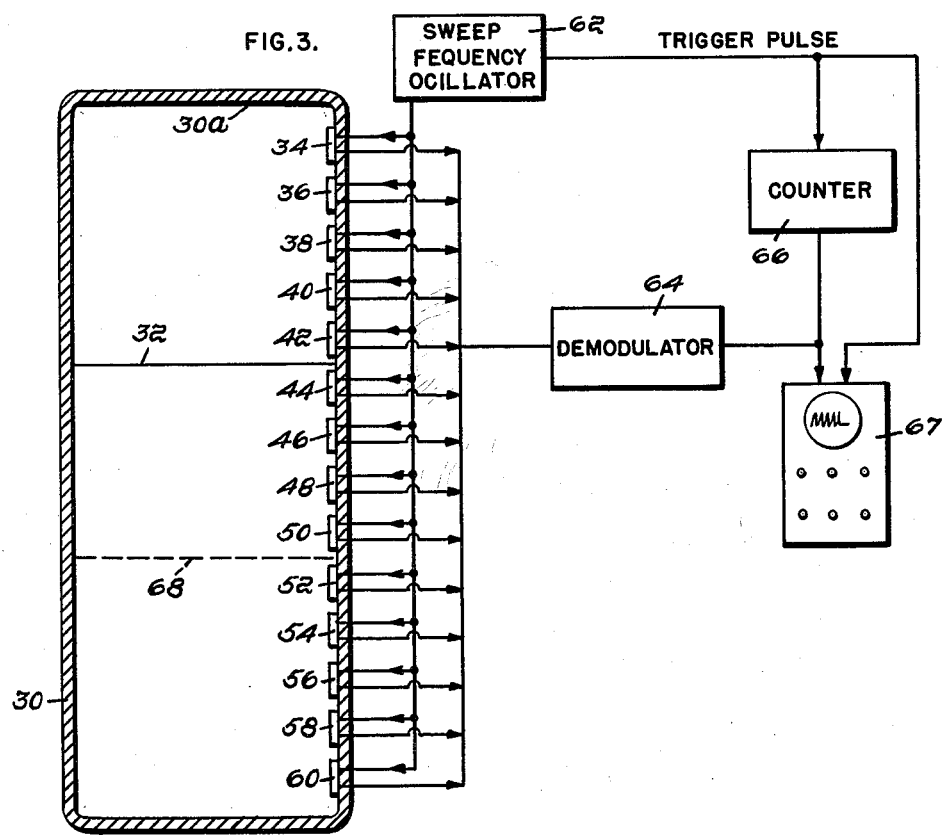

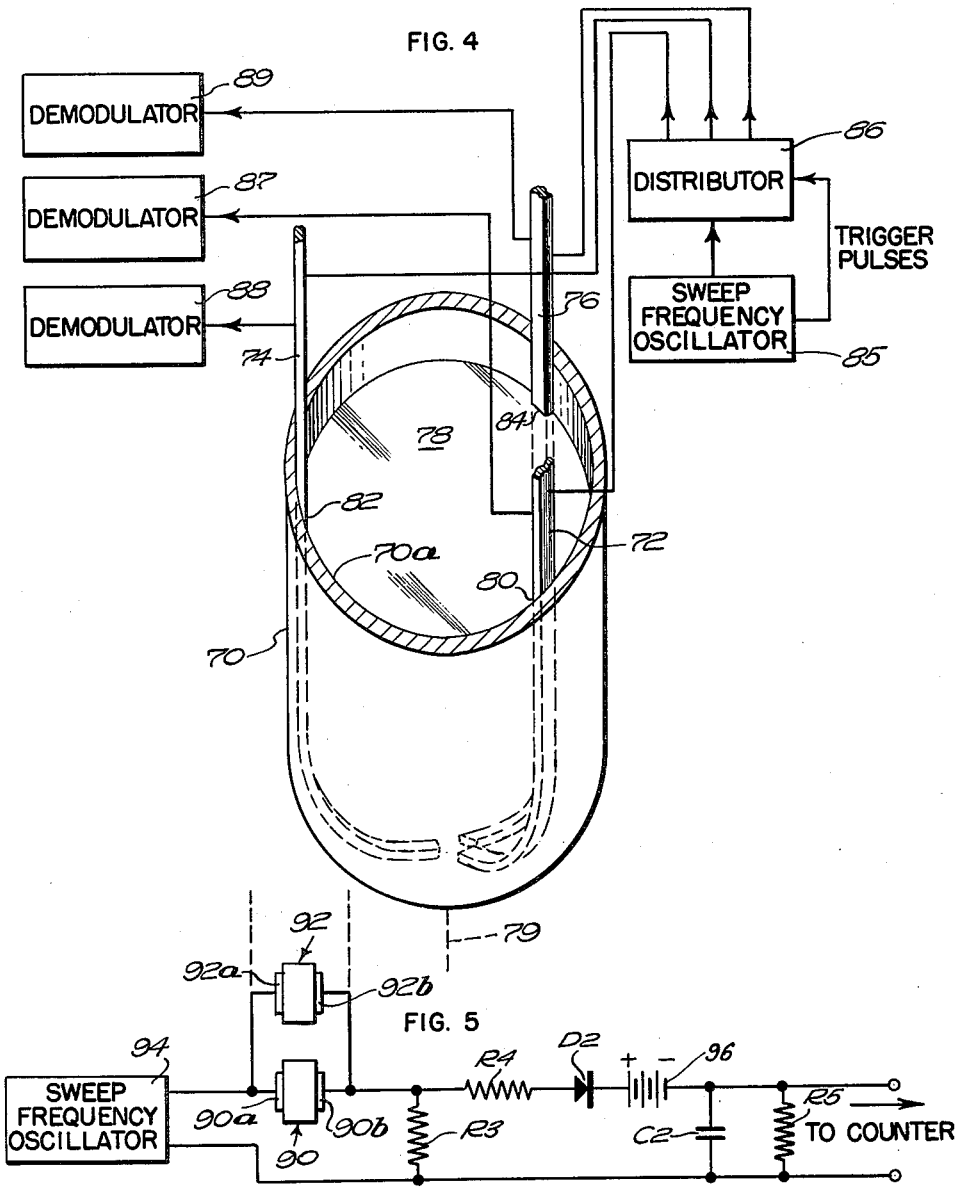

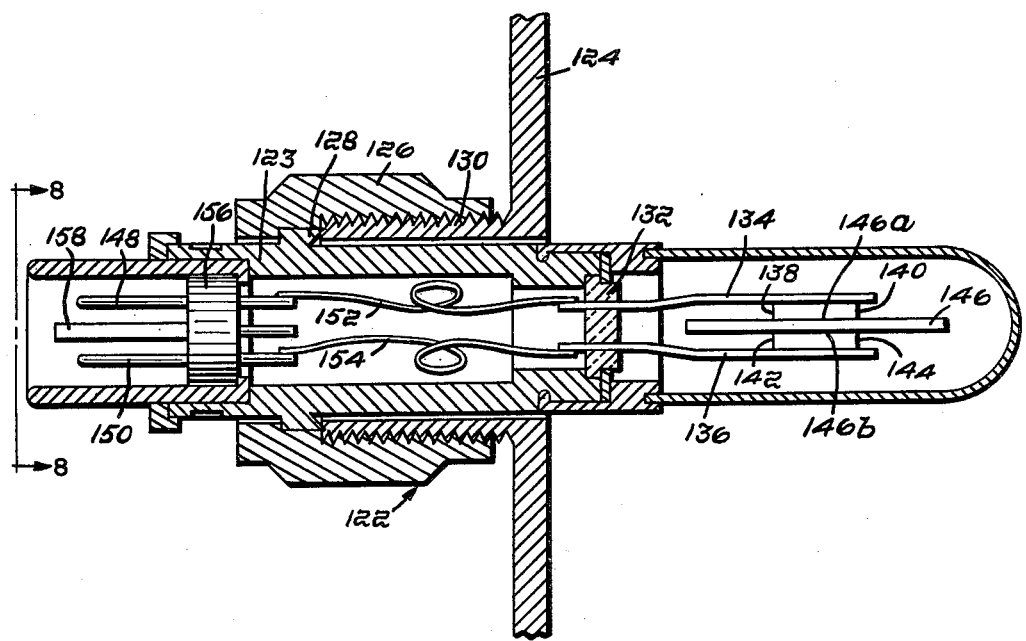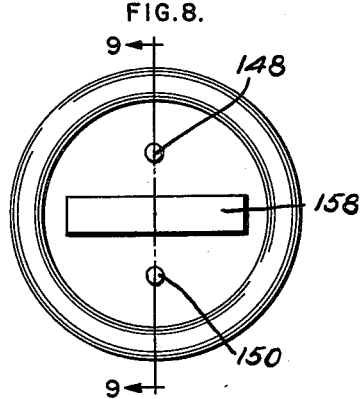
FIG. 7. FIG. 8. FIG. 9.
INVENTORS:
VERNON C. WESTCOTT,
ROBERT L. BLANCHARD,
BY Blair & Spencer
ATTORNEYS 3,110,890
APPARATUS FOR MEASURING FLUID LEVEL
Vernon C. Westcott, Lincoln, and Robert L. Blanchard, Chestnut Hill, Mass. (both % Trans-Sonics, Inc., P.O. Box 328, Lexington 73, Mass.)
Filed Mar. 3, 1958, Ser. No. 725,768
7 Claims. (Cl. 340—244)

This invention relates to apparatus for measuring the level of a flowable product in a container. More particularly it relates to apparatus which ascertains the presence of a liquid at a particular location in a container. Thus it may be used to determine whether the liquid in the container is above or below a certain point, e.g. whether the container is or is not full. The invention utilizes one or more vibratory electromechanical transducers whose vibrational characteristics are changed by contact with the fluid. These transducers are arranged as a part of an electrical circuit whose output reflects such changes. The output signal from such circuits is particularly useful in digital recording and data processing systems.

The most common instruments presently used for determining the level of a liquid in a container are ones which use a float riding on the surface of the liquid; the float is mechanically coupled directly to an indicator or indirectly by a potentiometer, variable capacitor, etc., providing an electrical output signal. Such instruments are generally restricted to stationary installations, as they are sensitive to inertial forces and are further restricted in operation to certain orientations of the containers in which they are mounted. For example, the reading of such an instrument will be inaccurate if the container is inverted or placed on its side. A further problem with instruments of this type is that in their practical embodiments they are attacked by corrosive materials and, having moving parts, cannot readily be sealed against such attack.

Prior level-sensing instruments have also been generally unsatisfactory for use at temperature extremes, as, for example, when measuring the level of liquified gases such as oxygen and nitrogen. The continuously variable or analogue output of such instruments is often relatively inaccurate, particularly since the electrical portion of the system may be sensitive to environmental conditions, age, etc., and the adjustment of the mechanical parts may also vary over a period of time.

Where the temperature of the fluid is greatly different from the ambient temperature, temperature-sensing devices have been used to measure the fluid level. Thus thermocouples, thermistors and other like devices may be positioned at various locations along the walls of a container to determine the presence of a fluid such as liquid oxygen or nitrogen at these points by measuring the container wall temperature. However, the temperature of the container wall does not change abruptly at the surface of these liquids; rather there is a gradual variation in temperature over a substantial region in the neighborhood of the fluid surface. Moreover, the thermal mass of the container wall is too large to permit rapid response of these systems to changes in the level of the fluid. The use of temperature-sensing devices for liquid level determination is thus impractical where precision and speed of measurement are required.

Accordingly it is an object of our invention to provide improved apparatus for detecting the presence of a flowable product at a given location. It is another object of our invention to provide apparatus of the above character which provides a distinctive electrical output signal indicating the presence or absence of a flowable product at a given location. It is yet another object of our invention to provide apparatus of the above character capable of operation in any orientation. It is a further object of our invention to provide level-detecting apparatus of the above character relatively insensitive to inertial forces. Another object of our invention is to provide apparatus of the above character which is useful with corrosive fluids and over a large range of temperatures. It is a still further object of our invention to provide apparatus of the above character requiring no conventional mechanical linkage and thus readily affording an absolute seal against leakage of the measured fluid. It is yet another object of our invention to provide apparatus having the above characteristics capable of precisely determining the level of the fluid in a container. A further object of our invention is to provide apparatus of the above character having an output signal in digital form and thus adapted for use with digital data processing equipment. Another object of our invention is to provide apparatus of the above character which is simple and inexpensive, yet rugged and insensitive to such environmental hazards as shock and temperature extremes. Other and further objects of our invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIGURE 1 is a block diagram of a fluid level detecting instrument made according to our invention and arranged to ascertain the presence of a liquid near the top of a container, FIGURE 2 is a schematic diagram showing in detail a transducer-demodulator arrangement which may be used in the liquid level detector of FIGURE 1, FIGURE 3 is a block diagram of a level or depth indicator made according to our invention and arranged to indicate the quantity of liquid in a container, FIGURE 4 is a schematic representation, partly in perspective showing another embodiment of a liquid level indicator arranged to determine the quantity of liquid for all orientations of the container, FIGURE 5 is a schematic representation similar to FIGURE 2 of a second transducer-demodulator arrangement which may be used in the systems of FIGURES 1, 3 and 4, FIGURE 6 is a schematic representation of another embodiment of our invention in which the sensing transducer is the frequency-determining element in an oscillator circuit, FIGURE 7 is a longitudinal sectional view of a fluid-sensing probe particularly useful in connection with the system of FIGURE 6, FIGURE 8 is a view taken along line 8—8 of FIGURE 7, and FIGURE 9 is a view taken along line 9—9 of FIGURE 8.

In one embodiment our fluid detecting system utilizes as its basic detecting element a vibrating electromechanical transducer such as a piezoelectric crystal or magnetostrictive device mechanically coupled to the interior of a container carrying the fluid, which may, for example, be a liquid. The transducer is electrically energized by an oscillator, whose range of frequencies includes one of the natural resonant frequencies of the transducer. As the output of the oscillator passes through resonance, the amplitude of the transducer vibrations undergoes an increase and decrease. If, however, the level of the liquid is at or above the point where the transducer is located in the container, the liquid damps the transducer vibrations; this lowers the effective Q of the transducer and substantially reduces the vibrational peak or peaks in the neighborhood of resonance. A detecting and demodulating circuit may be arranged to provide an indication whenever the vibration frequency of the undamped transducer passes through resonance. Fluid damping reduces the amplitude of this indication to a negligible level, and this low peak amplitude therefore indicates the presence of liquid in the container at the point where the transducer is located. It will be apparent that a simple transducer such as a piezoelectric crystal can in many cases be suspended in the interior of a sealed container at a desired point, to be directly contacted by the fluid if its level is at or above that point. Only the electrical leads to the crystal need be externally available for a rapid and precise determination of whether a required minimum volume of the fluid is in the container.

A bank of transducers having different resonant frequencies and operating in the manner described above may be used to determine the precise level of the fluid in a container. The transducers may be arranged in a vertical column with each one in turn being energized at one of its resonant frequencies by a sweep frequency oscillator. A detector-demodulator circuit connected to the transducers will register substantial output pulses from the undamped transducers above the level of the fluid and negligible output for the damped transducers at or below the surface thereof. By counting the number of pulses, the number of transducers above the surface of the fluid may be determined and the level of the liquid in the container can be accurately measured.

In other embodiments of our invention the transducer may be connected in the feedback circuit of an oscillator as the frequency-determining element thereof. The changes in mechanical or acoustical loading on the transducer, as it is coupled to and decoupled from the fluid under observation, are reflected back into the feedback network of the oscillator. These changes may be made to cause the circuit to change its frequency of oscillation or cease oscillation altogether. Such changes may be readily detected and displayed to indicate the presence or absence of the monitored fluid at the observed location.

An important advantage of the above systems is their complete freedom from inertial effects, since the amplitude of vibration of the transducers is essentially independent of acceleration. The operation of the transducers is also unaffected by the orientation of the container. Since there are no moving parts, the necessary seals between the interior and exterior of the container are relatively easy to make. The electrical output from the system may be in digital form and can therefore be applied directly to digital recording and data processing equipment. The system is also relatively unaffected by changes in environmental conditions, aging, etc.

Referring now to FIGURE 1, a container 2 holds a liquid whose level is indicated by the solid line 4. By way of example the liquid may be propane or "liquid gas" suitable upon evaporation for use in stoves and other household appliances and the container may be a conventional "bottle" used for such liquids. A valve 5 may be provided for connection to various gas appliances. Before delivery of the container it is desirable to know whether it has been filled to or beyond the level indicated by the dash line 6 and for this purpose there may be affixed to the interior wall 2a of the container 2 an electromechanical sensing transducer, generally indicated at 8 and more fully described below.

Transducer 8, which is arranged to contact any liquid propane at the level 6, is vibrated by an electrical oscillator 10, preferably at a natural series resonant frequency of the transducer. A "series resonant frequency," as the term is used herein, is a frequency at which the electrical impedance presented by the transducer is at a minimum.

In general, it is desirable that the output from the transducer be in pulse form; accordingly oscillator 10 is preferably a sweep frequency oscillator whose range of frequencies includes a resonant frequency of the transducer. The construction and operation of the apparatus will be described assuming that oscillator 10 is such an oscillator. However, it will be understood that other oscillators, including those having a fixed frequency output may be used.

The transducer may be constructed to provide an electrical signal whose amplitude is a direct function of the mechanical vibrational amplitude, as will be described below. This electrical signal is transmitted to a demodulator 11 whose output is in the form of a pulse when a sweep frequency oscillator is used, the pulse corresponding to the resonating of the undamped transducer. The pulse may be fed to a suitable indicator 12 such as an oscilloscope or a voltmeter and to a recorder 13.

More particularly, as seen in FIGURE 2, transducer 8 may comprise a piezoelectric crystal 14 having conventional input electrodes 16 and 17 connected to oscillator 10. The crystal 14 an delectrodes 16 and 17 are so constructed and arranged that the electrical energy applied to the electrodes by oscillator 10 causes the crystal to vibrate. In a well known manner the vibrations produce an alternating electrical potential across a pair of output electrodes 18 and 20 suitably affixed to the crystal, the magnitude of this output voltage being a direct function of the amplitude of the crystal vibrations. A suitable amplifier 22 may be interposed between the transducer and the demodulator 11 for isolation purposes. Such an amplifier is particularly useful where, as in the system illustrated in FIGURE 3, a number of transducers are connected to feed a single demodulator and it is desired to isolate the various transducers from each other. The amplifier may also serve to match the output impedance of the transducer to the input impedance of the demodulator.

Demodulator 11 includes a resistor R1, a diode D1 and the series combination of a resistor R2 and a capacitor C1, all connected across the output of amplifier 22. Resistor R1 acts as a loading resistor for the transducer, and resistor R2 and capacitor C1 form an RC filter integrating the rectified signal appearing across diode D1. The output of demodulator 11 is taken across capacitor C1, and the demodulator thus operates in the manner of a conventional amplitude-modulation detector with an output in the form of a direct-current signal whose level is substantially proportional to the amplitude of the alternating-current input from electrodes 18 and 20. Thus the voltage across capacitor C1 is dependent of the amplitude of vibration of crystal 14.

Assuming that container 2 in FIGURE 1 is filled only to the level 4 below transducer 8, the vibrations of crystal 12 will increase and decrease in magnitude as the swept frequency of oscillator 10 passes through the series resonant frequency of the crystal. The electrical output across electrodes 18 and 20 will therefore increase and decrease and a pulse will appear across capacitor C1. This pulse will be suitably indicated or recorded, as the case may be, by indicator 12 or recorder 13. If, however, container 2 has been filled to or above the desired level, for example to level 6, the liquid contained therein will damp the vibrations of crystal 14, thereby lowering the effective Q thereof. Thus as the oscillator frequency passes through crystal resonance, the increase in the amplitude of crystal vibration will be negligible. The output of demodulator 11 will therefore remain essentially constant and this will be indicated and recorded.

It will be understood that the relative dimensions of transducer 8 and container 2 have been exaggerated for purposes of clarity; in actual practice the transducer is made much smaller relative to the height of the container to provide sufficient resolution and minimize the effect of any ambiguity which may occur when the crystal is partially immersed in the fluid.

It will be apparent that the level detector of FIGURE 1 is exceedingly simple in construction and that it may be readily mounted on the interior surface of a tank or other container. While we have illustrated a system using a piezoelectric crystal as a transducer, it will be understood that other vibratory transducers, for example, may be particularly suitable in certain applications. However, the four-terminal transducer 8, described above, is particularly desirable where electrical isolation is required between the input and output circuits of the transducer. In general it is preferable that the transducers have a high natural Q so that output pulses produced by a sweep frequency oscillator are sharp and of appreciable magnitude. The desirable resonant frequency of the transducer depends upon such factors as transducer material, size, type of mounting and the particular fluid with which it is to be used. We have found, for example, that a quartz crystal which resonates in the region of 80 to 100 kilocycles per second is well suited for use in detecting the presence of trichlorethylene at a given location. Ordinarily it is desirable to resonate the transducer at its fundamental frequency; however, in certain applications harmonic resonances may be satisfactorily utilized.

In general we prefer to directly expose the sensing transducer to the monitored fluid. This eliminates the masking effect encountered when additional coupling devices are used to transmit the acoustical energy to the fluid. The transducer should, of course, be of a material which is compatible with the fluids contacted by it. In addition to quartz, other electrostrictive materials such as lithium sulphate and the barium titanate ceramics may be used as transducers, depending on the conditions of use, i.e. the fluid to be measured, environmental conditions such as temperature, etc. Among the magnetostrictive materials which are suitable are hard nickel, Monel metal and certain ferrites. For optimum resolution, the transducer is mounted with its largest surface parallel to the surface of the monitored fluid, i.e. with the shortest dimension of the transducer perpendicular to the fluid surface. Thus, an indication of a change in level of the fluid of as little as .015 inch may be detected with a piezoelectric crystal having a thickness of approximately the same magnitude.

In FIGURE 3, we have illustrated the use of our fluid detector in a fluid level measuring system. A tank 30 contains a liquid whose level is indicated by a line 32. A bank of transducers 34–60 is mounted in a vertical arrangement along the interior wall 30a of the tank. Each of the transducers may be similar to transducer 8 of FIGURES 1 and 2 and in similar fashion their input electrodes (not shown) may all be connected to a sweep frequency oscillator 62. The output electrodes (not shown) are preferably connected in parallel to a demodulator 64, similar to demodulator 11, whose output is fed to a counter 66, or to an oscilloscope 67. The transducers all have slightly different resonant frequencies, and they are preferably arranged in ascending or descending order of resonant frequency, i.e. the resonant frequency of transducer 34 is either higher or lower than that of transducer 36, which in turn has a resonant frequency either higher or lower than transducer 38. Sweep frequency oscillator 62 covers the entire resonance range of the bank of transducers and is preferably constructed to sweep over this range beginning with transducer 34 and progressing downwardly through the bank to transducer 60. The oscillator is also provided with means for producing a trigger pulse which may be used to reset the counter 66 at the beginning or end of each sweep, or to trigger the sweep of oscilloscope 67.

In operation, as oscillator 62 sweeps over the range of resonances, the outputs of transducers 34, 36, 38, 40 and 42 sharply increase and decrease in turn and a series of 5 pulses appears at the output of demodulator 64 to be counted by counter 66 or displayed on oscilloscope 67. When the oscillator output passes through the resonant frequencies of transducers 44 to 60, however, no pulses or pulses of very small amplitude appear at the output of the demodulator 64. Counter 66 is not responsive to these very small pulses, and the difference in amplitude between these pulses and those from the unimmersed transducers is readily apparent on the oscilloscope display. This reduction in pulse size is due to the damping of these transducers by the fluid in the manner described above. The number of pulses (5) registered by counter 66 or indicated on oscilloscope 67 thus indicates that the level 32 of the fluid is between transducers 42 and 44. In similar fashion, should the level of the liquid in tank 30 descend to the position indicated by the dash line 68, the counter and/or the oscilloscope will register 9 pulses each time the oscillator sweeps over the range of resonant frequencies, indicating that the level is between transducers 50 and 52.

In demodulator 64, which is similar to the demodulator 11 of FIGURE 2, the charge and discharge time constants associated with the integrating capacitor C1 should be short enough so that individual pulses will be registered for each undamped crystal resonated by the oscillator 62. The charge time constant is determined largely by the values of R1, R2, and C1, while the discharge time constant is determined by the values of C1, the sum of the values of R2 and R1 and also by the input resistance of the indicator, i.e. the recorder, counter or oscilloscope, to which the demodulator is connected.

The trigger or reset pulses may be formed by connecting the oscillator output to an undamped transducer (not shown) whose resonant frequency is at one end of the range of the resonant frequencies of the transducer bank. The output of this latter transducer may then be fed to a demodulator similar to demodulator 11, whose output is in the form of the required trigger pulse.

Where a large number of transducers are arranged as illustrated in FIGURE 3, the residual signal level in the demodulator produced by the combined output of the non-resonating transducers may cause difficulty in detecting the pulse output from a resonating transducer. In such case we prefer to feed the outputs of smaller groups of transducers to separate demodulators and then combine the outputs of the demodulators.

In FIGURE 4 we have illustrated an arrangement incorporating the system of FIGURE 3 for use when the angle between the surface of the measured fluid and a blank of transducers is subject to variation. Thus in a container carried by a moving vehicle the surface of a liquid carried therein may deviate from the horizontal under the force of acceleration, or the orientation of the container may vary with respect to its initial position. Where there is sufficient information concerning acceleration and container orientation available from other sources, the instrument shown in FIGURE 3 may be satisfactorily used if the output thereof is compensated in accordance with such information. However, the embodiment of FIGURE 4 provides the required information without the need for additional instrumentation.

More particularly, as shown therein, a container 70 has three banks of transducers generally indicated at 72, 74 and 76 affixed to its interior wall 70a and preferably spaced equidistantly from each other about the periphery of the enclosure. Container 70 contains a liquid whose surface 78 is not perpendicular to its longitudinal axis 79. The surface 78 thus intersects banks 72, 74 and 76 at points 80, 82 and 84, respectively. The transducer banks are preferably similar in construction to the bank illustrated in FIGURE 3 and they are also preferably swept in turn by a sweep frequency oscillator 85 through a suitable three-position switch 86 actuated by trigger pulses obtained in the above-described manner. Thus each trigger pulse causes the switch to move to its next position and switch the oscillator to the next transducer bank to be energized. As the transducers in bank 72 are energized, the numbers of output pulses produced in a suitable demodulator 87 connected to the transducers indicates the location of point 80. In like manner the locations of points 82 and 84 are determined when banks 74 and 76 are energized, these banks being connected to demodulators 88 and 89. With three points on the surface 78 thus known, the location and orientation of the surface is determined with substantial accuracy and the volume of liquid in the tank can be readily computed.

In FIGURE 5 we have illustrated a circuit in which two-terminal transducers are utilized in place of the four-terminal transducer illustrated in FIGURE 2. A bank of parallel-connected piezoelectric transducers, generally indicated at 90, 92, etc., and having electrodes 90a and 90b, 92a and 92b, etc., may be mounted in the manner described above in the interior of a liquid-carrying container. A sweep frequency oscillator 94 is connected to excite the transducers through a series resistor R3. As each undamped crystal goes through series resonance, the amplitude of the voltage across it sharply drops and rises and the voltage across resistor R3 correspondingly rises and drops. The signal appearing across resistor R3 is rectified by a diode D2 and passed to an integrating circuit comprising a resistor R4 and capacitor C2 to form an output pulse across the capacitor. A resistor R5 connected across the capacitor discharges it at the termination of each pulse.

The circuit of FIGURE 5 thus operates in the same manner as the circuit of FIGURE 2, a pulse appearing across capacitor C2 each time the output of oscillator 94 passes through the resonant frequency of an undamped crystal. A battery 96 may be inserted in series with diode D2 to bias the diode toward cutoff. The battery voltage is such that it blocks pulses from the damped transducers and thereby increases the ratio of the height of pulses from undamped transducers to that of pulses from the damped ones. The order of sensitivity obtainable with this circuit is indicated by the fact that the impedance of a typical quartz crystal sensing transducer may range between approximately 1000 ohms in air and more than 100,000 ohms in a liquid environment.

FIGURE 6 illustrates another embodiment of our invention in which the fluid-sensing transducer is the frequency-determining element of an oscillator. Thus an amplifier generally indicated at 100 may have three cascaded stages 102, 103 and 104. The output of the third stage 104 is fed back to the input of the first stage 102 through a bridge generally indicated at 106 by way of an output transformer 108.

More particularly, bridge 106 comprises a pair of resistors R6 and R7 on one side and a capacitor C3 and a sensing transducer 110 on the other side. In the illustration transducer 110 is a two-terminal electrostrictive transducer similar to transducer 90 of FIGURE 5. However it will be apparent that an oscillator feedback network might incorporate a four-terminal transducer like transducer 8 of FIGURE 2. A resistor R8 is connected across junctions 112 and 114 of the bridge by way of a ground return, as is the input to the first stage 102 of amplifier 100. Resistor R8 carries the unbalance current of bridge 106, and the input signal to stage 102 is therefore proportional to this current. The output of transformer 108 is connected across junctions 116 and 117 of bridge 106, and the polarity of the transformer is preferably arranged to provide positive feedback through the bridge when the transducer 110 is at series resonance. As will be explained, resistors R6, R7 and R8 are preferably of low resistance compared with the resistance of transducer 110, for example, 50 ohms as against approximately 1000 ohms for a quartz transducer vibrating in air.

A piezoelectric transducer, e.g. a quartz crystal, may be considered to present at its terminals the electrical impedance represented by a capacitor in parallel with a series R-L-C circuit. Thus, even when the transducer is at series resonance, reactive current may still flow through the parallel capacitance, and in a conventional feedback circuit this will result in a quadrature component being fed back to the input. We have found it desirable, however, to have the phase shift through the feedback network be as small as possible. This is accomplished by setting the value of capacitance C3 at such a level as largely to "cancel" the parallel capacitance of the transducer 110 in the neighborhood of resonance. Consequently the unbalance current through resistor R8 will be in phase with the output voltage from transformer 108, as will the input signal to stage 102.

The output of the fluid sensor of FIGURE 6 is preferably taken from terminals 118 and 119 between the second and third stage of amplifier 100.

The instrument of FIGURE 6 may be operated in either of two ways. First, since loading by a medium such as a liquid, which is denser than air, increases the effective electrical resistance of the transducer 110, the unbalance current through resistance R8 will decrease whenever the transducer contacts the medium. The signal fed back to the first amplifier stage 102 is thereby decreased, and, if the overall gain of amplifier 100 is sufficiently low, the circuit will cease oscillation. An amplitude-sensitive detector 120, similar to demodulator 11, may be connected to the output terminals 118 and 119 to ascertain the presence or absence of the monitored fluid at the observed location by the absence or presence of an alternating-current signal in the amplifier.

On the other hand, the gain of amplifier 100 may be set to provide oscillation under both conditions of operation, e.g. immersion and non-immersion of the transducer in the monitored fluid. The amplitude of oscillation will decrease when the transducer is coupled to a more dense fluid and detector 120 will respond to such change. Operation in this mode is particularly desirable where the system is to operate in a location remote from the observer. The amplitude level of the oscillations indicates the presence or absence of the monitored fluid at the observed location and a cessation of oscillation indicates malfunction of the system.

It will also be noted that the increased inertial loads imposed on the transducer by denser media are reactive in nature; this is equivalent to the insertion of a reactance into the equivalent electrical representation of the transducer and such loads thus cause changes in the resonant frequency of the transducer. The frequency of oscillation varies accordingly, and this can be ascertained by a suitable frequency-sensitive detector 121 connected to output terminals 118 and 119. Thus oscillation at one frequency, as determined by the detector 121 will indicate presence of the monitored fluid at the observed location and oscillation at another frequency will indicate its absence.

In general, a frequency-sensitive device connected to output terminals 118 and 119 will operate best in the absence of amplitude variations. Therefore, when using the circuit in this manner, the gain of the first amplifier stage 102 should be sufficient to saturate the second stage, i.e. obtain maximum output from this stage, under all conditions of operation. The output of the second stage will then be essentially free of amplitude variation. Naturally, where detector 120 is used with a constantly oscillating circuit, as described above, amplitude variations at the output are to be desired; the gain of the first stage 102 should then be kept below the level required for saturation of the second stage. The output of the second stage 103 should be more than sufficient to saturate the third stage 104 when the amplitude-sensitive detector 120 is connected to the output terminals. The output of the latter stage will then be constant, regardless of the loading on the second stage 103 by detectors 120 and 121; and the proportionality of output to input signal of the amplifier 100 will be determined solely by the mechanical or accoustical load imposed on the transducer.

Whenever a probe is used to determine the presence of an extremely cold fluid such as liquid oxygen at a given location in a container thereof, portions of the probe exterior of the container generally become cold enough to cause condensation of atmospheric moisture. Such condensation often freezes and bridges the space between electrical terminals to provide an electrical conducting path between them; if the terminals are connected to a piezoelectric sensing element, the element will be shunted and its effectiveness greatly diminished.

In FIGURES 7, 8 and 9 there is illustrated a probe assembly which, when used with the circuit of FIGURE 6, greatly diminishes the condensation problem. A probe generally indicated at 122 has a shank 123 extending through a wall 124 (FIGURE 7) of a container holding liquid oxygen or other material at a depressed temperature. Shank 123 is secured in place by a collar 126, which engages a shoulder 128 on the shank and is threaded onto a nipple 130 secured to the wall 124. A glass seal 132 extending across shank 123 supports a pair of crystal mounting wires 134 and 136, and four crystal supports 138, 140, 142 and 144, welded or otherwise suitably connected to wires 134 and 136, support a crystal 146. Crystal 146 may be the transducer 110 of FIGURE 6 or transducer 90, 92, etc., of FIGURE 5. As such, it is preferably a quartz crystal, cut so as to expand and contract along its lengthwise axis (arrow in FIGURE 7) upon application of an alternating potential across its faces 146a and 146b. Suitable electrodes (not shown) may be conventionally formed on faces 146a and 146b by electrodeposition, evaporation or other well known processes, and supports 138–144 may be soldered or otherwise suitably affixed to these electrodes. Preferably the mass and compliance of the supports are so chosen that the supports have a resonant frequency substantially the same as that of crystal 146.

In the above arrangement wires 134 and 136 serve as electrical leads from the crystal 146 and are connected to probe terminals 148 and 150 by a pair of wires 152 and 154. Terminals 148 and 150 are mounted in a glass seal 56 which, together with seal 132, hermetically seals the interior of shank 122. The interior of the shank should be free from water vapor to prevent condensation therein.

Terminals 148 and 150, however, are exposed to atmospheric moisture, and, since metallic electrical conducting paths are also efficient heat conductors to the cold interior of the container, condensation will form and freeze on the terminals. In prior probes this condensation would eventually bridge across the terminals to shunt the crystal as pointed out above. To prevent such shunting, we have provided a metallic barrier 158 disposed between terminals 148 and 150, and electrically connected to ground (FIGURE 6). As best seen in FIGURE 9, the build-up of frost will be between barrier 158 and each of the two terminals, electrically from each of the terminals to ground. As seen in FIGURE 6, this amounts to shunting resistances R7 and R8; but, since these resistances are small, their effective values are negligibly changed by the condensation and the operation of the oscillator will be substantially unaffected thereby. On the other hand, if the condensation were to bridge the terminals 148 and 150 and directly shunt the higher impedance crystal 146, the impedance across the terminals would be considerably changed and the consequent change in feedback ratio of the oscillator would seriously affect its operation.

Thus we have described a simple efficient fluid detector which utilizes a stationary sensing element to determine the presence of the fluid at a given location in a container. The sensing element, which is a vibratory electromechanical transducer, can be readily secured in place and is operable at all orientations of the container and under conditions of extreme shock. The detector operates efficiently at both elevated and depressed temperatures. The sensing transducer may, in one embodiment, be incorporated in an oscillator circuit as the frequency-determining element thereof; or it may be driven by a separate oscillator. In either case suitable demodulating apparatus has been described which provides a readily usable output signal indicating the presence or absence of the fluid at the monitored location. We have disclosed a novel probe used to mount a sensing transducer in our fluid detector. The probe is particularly suitable for use with low temperature fluids, since it renders the system essentially immune to condensation at the external electrical terminals of the probe.

We have also described a level measuring instrument incorporating a number of transducers of the type described which are disposed to detect the presence of the fluid at a plurality of locations in a container. The level of the fluid is determined by ascertaining the locations contacted by the fluid and those not so contacted. The instrument is relatively unaffected by environmental conditions, aging, etc., and provides an output which may be directly utilized in digital data processing equipment. It is readily adapted for precise measurement of the quantity of of fluid in the container for all orientations of the container. While the embodiments disclosed above are specifically described in conjunction with the detection of liquids, other fluids, such as gases and finely divided solids are susceptible of detection by apparatus encompassed by the present invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the inveniton which, as a matter of language might be said to fall therebetween.

We claim:

1. In apparatus for determining the conditions of presence and absence of a fluid at a location the combination of an oscillatory circuit comprising an amplifier having a plurality of stages of amplification and a feedback network including an electromechanical transducer having a pair of electrodes, said transducer being adapted to vibrate mechanically upon the application of an alternating potential across said electrodes, said feedback network including a four terminal bridge circuit, the output of said amplifier being connected across a first opposing pair of said terminals and the input of said amplifier being connected across a second opposing pair thereof whereby the unbalance signal in said bridge is applied to said input, said transducer being connected into one arm of said bridge, said feedback network being so connected that positive feedback is applied to said input at a resonant frequency of said transducer, said transducer being mechanically coupled to said location, whereby the characteristics of oscillation of said circuit vary in accordance with the presence or absence of said fluid at said location and means for detecting changes in the oscillatory characteristics of said circuit.

2. The combination defined in claim 1 in which said amplifier has sufficient gain to cause oscillation of said circuit under but one of said conditions, said combination including detecting means responsive to the amplitude of oscillation, whereby said detector ascertains the presence or absence of oscillations of said circuit and thereby determines the presence or absence of said fluid at said location.

3. The combination defined in claim 1 in which said amplifier has sufficient gain to provide oscillation under both of said conditions, said combination including means for detecting the change in frequency of oscillation resulting from a change from one to the other of said conditions, thereby to ascertain the presence or absence of said fluid at said location.

4. In apparatus for determining the conditions of presence and absence of a fluid at a location, the combination of an oscillatory circuit comprising an amplifier and a feedback network, said feedback network including a four-terminal bridge circuit, the output of said amplifier being connected across first and second opposite terminals of said bridge and the input of said amplifier being connected across third and fourth oppositely disposed terminals, whereby the unbalance signal in said bridge is applied to said input, an electromechanical transducer having a pair of electrodes, said transducer being adapted to vibrate mechanically upon the application of an alternating potential across said electrodes, said transducer being connected between said second and third terminals, said feedback network being so connected that oscillatory feedback is applied to said input at a resonant frequency of said transducer, said transducer being mechanically coupled to said location, whereby the characteristics of oscillation of said circuit vary in accordance with the presence and absence of said fluid at said location and means for detecting changes in the oscillatory characteristics of said circuit.

5. The combination defined in claim 4 in which said transducer is a piezoelectric crystal, said combination including impedance means connected between said first and third terminals of said bridge and adapted substantially to cancel the effect of the parallel capacitance of said crystal at the input of said amplifier at the frequency of oscillation of said circuit.

6. The combination defined in claim 4 including a probe adapted to support said transducer at said location, said probe having fifth and sixth terminals providing conducting paths between said electrodes of said transducer and said second and third terminals of said bridge and a conductive baffle disposed between said fifth and sixth terminals and connected to said fourth terminal of said bridge, first and second impedance means connected between said second terminal and said fourth terminal and between said third terminal and said fourth terminal, said impedance means having low impedances compared to that of said transducer, whereby condensate may not form directly between fifth and sixth terminals and formation of electrically conducting condensate between said fifth and sixth terminals and said baffle has substantially no effect on the operation of said circuit.

7. In apparatus for determining the conditions of presence and absence of a fluid at a location, the combination of an oscillatory circuit comprising an amplifier and a feedback network, said network including a piezoelectric transducer having first and second electrodes, said transducer being adapted to vibrate mechanically upon application of an alternating potential across said electrodes, said amplifier having first and second output terminals and first and second input terminals, means connecting said first output terminal to said first electrode of said transducer, means connecting said first input terminal to said second electrode, a junction point, a first impedance element connected between said first electrode and said junction point and a second impedance element connected between said first input terminal and said junction point, means subjecting said transducer to the buildup of electrically conducting condensation between said first and second electrodes, said first and second impedance elements having a combined series impedance substantially less than that of said condensate, whereby buildup of said condensate across said first and second electrodes of said transducer has substantially no effect on the operation of said circuit, means mechanically coupling said transducer to said location, said feedback network being adapted to provide oscillation in said circuit when one of said conditions exists, and means for detecting a change in the oscillatory characteristics of said circuit in response to a change from one of said conditions to the other, thereby to determine the presence or absence of said fluid at said location.

References Cited in the file of this patent

UNITED STATES PATENTS

| | | |
|---|---|---|
| 2,138,036 | Kunze | Nov. 29, 1938 |
| 2,384,465 | Harrison | Sept. 11, 1945 |
| 2,418,846 | Meacham | Apr. 15, 1947 |
| 2,435,880 | Eilenberger | Feb. 10, 1948 |
| 2,523,363 | Geham | Sept. 26, 1950 |
| 2,611,873 | Gager | Sept. 23, 1952 |
| 2,616,020 | Fay et al. | Oct. 28, 1952 |
| 2,663,765 | De Boisblanc | Dec. 22, 1953 |
| 2,668,365 | Hogin | Feb. 9, 1954 |
| 2,709,918 | Yetter | June 7, 1955 |
| 2,713,263 | Turner | July 19, 1955 |
| 2,808,581 | Findlay | Oct. 1, 1957 |
| 2,863,472 | Coles et al. | Dec. 9, 1958 |
| 2,871,356 | Sulzer | Jan. 27, 1959 |
| 2,932,818 | Lubkin | Apr. 12, 1960 |
| 2,990,543 | Rod | June 27, 1961 |

OTHER REFERENCES

Ultrasonic Level Sensor in Instruments and Automation, May 1957, vol. 30, No. 5 (pages 886–887). (Photo copy in Division 36.)